April 18, 1961   J. M. S. KEEN   2,980,199
VARIABLE AREA JET PROPULSION NOZZLES
Filed March 15, 1957
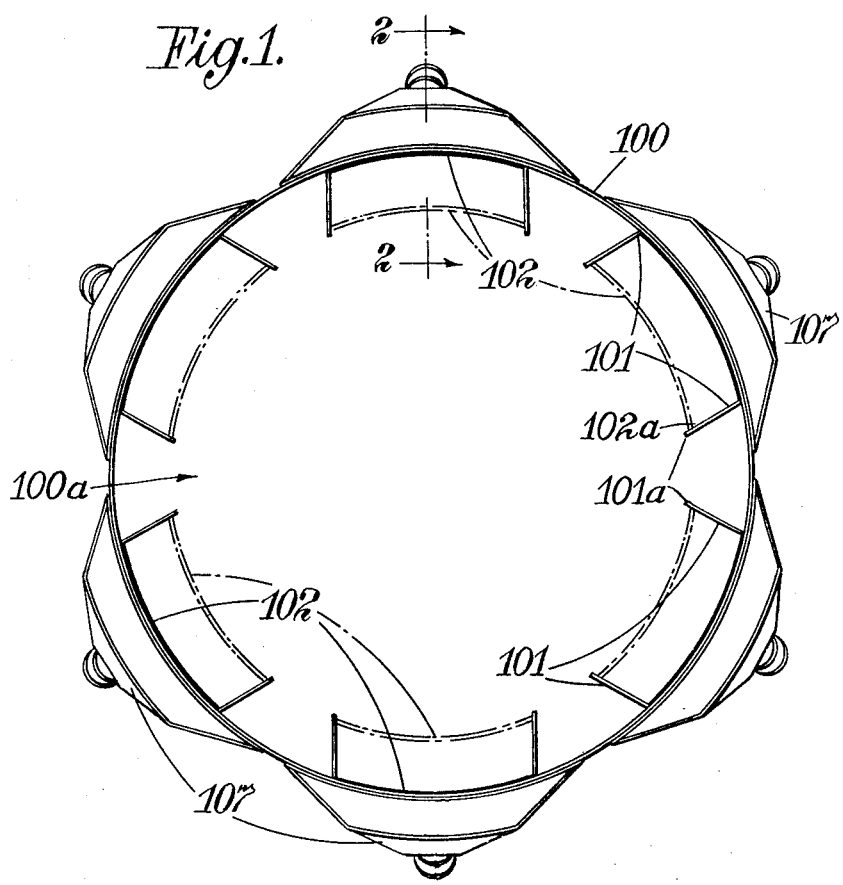
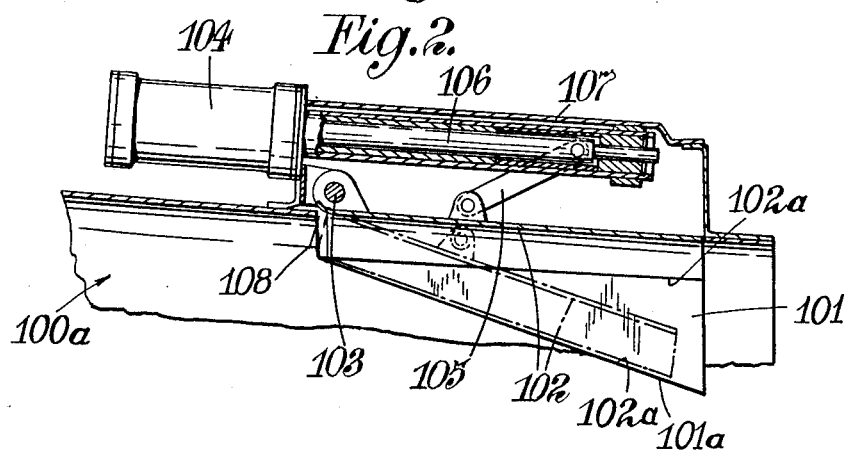

United States Patent Office 2,980,199
Patented Apr. 18, 1961

2,980,199

VARIABLE AREA JET PROPULSION NOZZLES

John Michael Storer Keen, Allestree, England, assignor to Rolls-Royce Limited, Derby, England, a British company Filed Mar. 15, 1957, Ser. No. 646,494

Claims priority, application Great Britain Mar. 16, 1956

6 Claims. (Cl. 181—41)

This invention comprises improvements in or relating to jet propulsion nozzles such, for example, as are employed in aircraft and is concerned with silenced jet propulsion nozzles.

According to the present invention a jet nozzle for propulsion purposes comprises a tubular nozzle structure and at least six flap members pivoted thereto about axes contained in a plane lying substantially at right-angles to the axis of the tubular structure, said flap members extending peripherally between substantially parallel walls supported by said structure, which walls extend substantially parallel to a plane containing the nozzle axis.

Preferably the combined peripheral extent of the flap members represents a major portion of the peripheral extent of the jet nozzle at its exit.

According to a feature of the invention the flap members co-operate with the pairs of side walls in gas sealing engagement.

In Rolls-Royce British Patent No. 768,553 there is described and claimed, "The combination with a jet-propulsion engine of a propelling nozzle comprising a rigid tubular structure through which exhaust gas from the engine flows, and from the downstream end of which said exhaust gas is discharged to atmosphere to provide a propulsive thrust, said tubular structure providing internally thereof for the flow of exhaust gas a cross-sectional area which decreases from the upstream end of the nozzle towards the downstream end thereof over at least part of the axial length of the nozzle, and providing also a selected number of circumferentially-spaced channels having a fixed configuration which extend in an axial direction from adjacent the upstream end of the nozzle to the downstream end thereof, exhaust gas flowing through said channels and emerging therefrom in a number of circumferentially-spaced streams between which mixing of the exhaust gas with air takes place, whereby in operation of the engine the intensity of audible noise is reduced substantially as compared with a plain frusto-conical nozzle."

Jet nozzles in accordance with the present invention can be used in the combinations recited above to provide a nozzle structure which is capable of adjustment from a position in which the intensity of audible noise is reduced, for example, for take-off conditions of an aircraft, to a position in which the nozzle configuration approximates more closely to a normal nozzle in which provision is not made for such silencing.

One preferred embodiment of the invention is illustrated in the accompanying drawings in which Figure 1 is an end view of the nozzle, and Figure 2 is a section on the line 2—2 of Figure 1, and is drawn to a larger scale than Figure 1.

Referring to the figures, the nozzle comprises a tubular part 100 having projecting from it into the gas passage 100a a series of six pairs of fixed parallel walls 101. Between each pair of the walls 101 there is a flap member 102 of curved section which is mounted on the tubular member adjacent the upstream ends of the walls 101 by a pivot pin 103. The flap member 102 is actuated by a ram 104 through a link connected to the ram piston rod 106. The ram is mounted on the exterior of a blister housing 107 and its piston rod 106 projects into the housing 107.

In one position (shown in full lines in Figure 2) the flap members 102 occupy cut-outs 108 in the tubular member 100 and in this position the minimum reduction of audible noise is obtained. In a second position (shown in dotted lines in Figure 2) the flap members 102 have their edges 102a coincident with the inner edges 101a of the walls 101 and in this position the maximum reduction of audible noise is obtained. It will be noted that in moving between the first position and second position there is a reduction of the outlet area of the nozzle; such reduction of area is satisfactory in certain applications of jet propulsion engines to aircraft for take-off, i.e. when the maximum reduction of audible noise is required.

It will be seen that the total peripheral extent of the flap members 102 is a major proportion of the total peripheral extent of the nozzle at its outlet.

Preferably the flap members 102 slide over the walls 101 in gas sealing contact.

I claim:

1. A propelling nozzle for a continuous combustion jet propulsion engine, said nozzle comprising a tubular wall structure through which exhaust gases from the engine flow in a continuous stream, said exhaust gases being discharged to atmosphere from the downstream end of said nozzle to provide propulsive thrust, said tubular structure having a cross-sectional area which decreases from the upstream end of the nozzle towards the downstream end thereof over at least part of the axial length of the nozzle, a series of at least six angularly-spaced flap members accommodated within said tubular wall structure, each said flap member being mounted to swing towards and away from the tubular wall structure about an axis disposed substantially at right angles to a plane containing the longitudinal axis of the nozzle, and a corresponding series of angularly-spaced pairs of fixed walls projecting inwardly from the tubular wall structure into the gas stream and being in planes parallel with the longitudinal axis of the nozzle, and each pair of walls being associated with a corresponding one of the flap members and being positioned one on each side of the associated flap member so that the flap member swings between them.

2. A propelling nozzle as claimed in claim 1, in which the longitudinal edges of the associated flap member slide in gas sealing engagement with the associated pair of inwardly-projecting walls.

3. A propelling nozzle as claimed in claim 1, in which the transverse cross-sectional shape of each of the said flap members corresponds with the transverse cross-sectional shape of said tubular wall structure.

4. A propelling nozzle as claimed in claim 1, in which each of said flap members is mounted for movement between a position where it lies flush with the tubular wall structure, and a further position in which it co-operates with the associated pair of inwardly-projecting walls and forms a projection within the gas passage through the nozzle, which projection increases in cross-sectional area toward the downstream end of said nozzle.

5. A jet propulsion nozzle for a continuous combustion jet propulsion engine, which nozzle comprises a rigid tubular wall member having an outlet at one end and defining a gas passage through which exhaust gases flow from the engine to the outlet, said gas passage having a cross-sectional area which decreases from the upstream end of the nozzle towards the outlet at least over part of its axial length, at least one longitudinally-extending flap member accommodated within the tubular wall member, pivot means supporting the flap member at its upstream end from the tubular wall member to swing about an axis substantially tangential to the tubular wall member between first and second positions, said flap member including a longitudinally-and-circumferentially-extending wall extending axially downstream from said pivot means, which longitudinally-and-circumferentially-extending wall in said first position projects into said gas passage and reduces the effective area of the nozzle and which in said second position is retracted flush with the tubular wall member and forms substantially a smooth continuation of said tubular wall member, said tubular wall structure including walls extending externally of the said flap member and defining with the longitudinally-and-circumferentially-extending wall of the flap member a chamber closed off from atmosphere, said chamber being in communication with the gas passage whereby the pressure within the chamber is substantially equal to the pressure of the gas stream and thus the pressures on each side of said longitudinally-and-circumferentially-extending wall are equalized, and a pair of circumferentially-spaced parallel walls projecting inwardly from the tubular wall member one on each side of said flap member which parallel walls extend substantially parallel to a plane containing the nozzle axis, said longitudinally-and-circumferentially-extending wall of the flap member extending between and sliding over said parallel walls.

6. A jet nozzle according to claim 5 comprising about six such flap members disposed equi-angularly around the tubular wall member.

References Cited in the file of this patent

UNITED STATES PATENTS

| | | |
|---|---|---|
| 2,569,497 | Schiesel | Oct. 2, 1951 |
| 2,669,834 | Helms | Feb. 23, 1954 |

FOREIGN PATENTS

| | | |
|---|---|---|
| 1,102,597 | France | May 11, 1955 |
| 781,661 | Great Britain | Aug. 21, 1957 |